US008949839B2

(12) United States Patent
Balasubramaniam et al.

(10) Patent No.: US 8,949,839 B2
(45) Date of Patent: Feb. 3, 2015

(54) METHOD AND SYSTEM FOR CONTROLLING WORK REQUEST QUEUE IN A MULTI-TENANT CLOUD COMPUTING ENVIRONMENT

(75) Inventors: Srinivasan Balasubramaniam, Fremont, CA (US); Kenneth Robert Owens, Jr., St. Louis, MO (US)

(73) Assignee: CenturyLink Intellectual Property LLC, Denver, CO (US)

( * ) Notice: Subject to any disclaimer, the term of this patent is extended or adjusted under 35 U.S.C. 154(b) by 140 days.

(21) Appl. No.: 13/559,278

(22) Filed: Jul. 26, 2012

(65) Prior Publication Data

US 2014/0033212 A1 Jan. 30, 2014

(51) Int. Cl.

| | |
|---|---|
| ***G06F 9/46*** | (2006.01) |
| ***G06F 12/14*** | (2006.01) |
| ***G06F 11/00*** | (2006.01) |
| ***G06F 9/48*** | (2006.01) |
| ***H04L 29/06*** | (2006.01) |

(52) U.S. Cl.

CPC .............. *G06F 9/4881* (2013.01); *H04L 63/12* (2013.01)

USPC .................. 718/102; 726/22; 726/23; 714/48

(58) Field of Classification Search

None

See application file for complete search history.

(56) References Cited

U.S. PATENT DOCUMENTS

| | | | |
|---|---|---|---|
| 7,975,269 | B2 | 7/2011 | Bates et al. |
| 8,065,395 | B2 | 11/2011 | Burch et al. |
| 8,429,097 | B1 * | 4/2013 | Sivasubramanian et al. ... 706/12 |
| 2008/0072230 | A1 | 3/2008 | Jackson |
| 2010/0319004 | A1 | 12/2010 | Hudson et al. |
| 2011/0010339 | A1 | 1/2011 | Wipfel et al. |
| 2011/0016214 | A1 | 1/2011 | Jackson |
| 2011/0078303 | A1 | 3/2011 | Li et al. |
| 2011/0153824 | A1 | 6/2011 | Chikando et al. |
| 2011/0213712 | A1 | 9/2011 | Hadar et al. |
| 2012/0096470 | A1 | 4/2012 | Bartfai-Walcott et al. |
| 2012/0102489 | A1 | 4/2012 | Staiman et al. |
| 2012/0110589 | A1 | 5/2012 | Ghosh et al. |

FOREIGN PATENT DOCUMENTS

| | | |
|---|---|---|
| WO | WO 2014/018451 | 1/2014 |

OTHER PUBLICATIONS

International Search Report and Written Opinion prepared by the U.S. Patent and Trademark Office as International Searching Authority for PCT International Patent Application No. PCT/US2013/051502, mailed Oct. 1, 2013, 10 pages.

International Application Published Under the Patent Cooperation Treaty; PCT App. No. PCT/US2013/051502; Publication date Jan. 30, 2014; 33 pages.

* cited by examiner

*Primary Examiner* — Meng An

*Assistant Examiner* — Bing Zhao

(74) *Attorney, Agent, or Firm* — Swanson & Bratschun, L.L.C.

(57) ABSTRACT

Novel tools and techniques for controlling workloads in a multi-tenant environment. Some such tools provide a queue controller that can control workflow processing across systems, work (provisioning engines, computing clusters, and/or physical data centers. In an aspect, a queue controller can determine the status of each work request based on one or more attributes, such as the workflow type, the systems affected by (and/or involved with) the workflow, information about the tenant requesting the workflow, the job type, and/or the like. In another aspect, a queue controller can be policy-based, such that policies can be configured for one or more of these attributes, and the attribute(s) of an individual request can be analyzed against one or more applicable policies to determine the status of the request. Based on this status, the requested work can be scheduled.

19 Claims, 5 Drawing Sheets

METHOD AND SYSTEM FOR CONTROLLING WORK REQUEST QUEUE IN A MULTI-TENANT CLOUD COMPUTING ENVIRONMENT

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to hosted computing systems, and more particularly, to solutions to provide more robust control over workloads in hosted computing systems.

BACKGROUND

Hosted, multi-tenant computing systems (also known as "cloud computing" systems) offer several advantages over conventional enterprise-specific hardware systems. For one thing, a single cloud system can provide computing resources for a number of customers (also referred to herein as "tenants"), allowing the capital costs for hardware (and, in some cases software) to be shared by multiple enterprises. Moreover, in some implementations, a multi-tenant hosted system can provide resources to each tenant on-demand. In this way, the hosted system can provide resources as needed (including additional resources at peak times) without requiring the tenant to pay for peak resources at all times.

One problem that arises in a multi-tenant system, however, is the scheduling and prioritization of workloads. For instance, in a typical multi-tenant system, several hundred independent requests might arrive simultaneously from different tenants. These requests can range from queries about the status of a tenant's multiple environments, to provisioning new services, to modifying existing services, to creating a ticket or work request. Each tenant has an expectation that its request will be carried out in a timely manner; however, the systems that make up these services often do not have the ability to handle requests from multiple tenants simultaneously. In addition, when maintenance activities happen during the scheduled maintenance window, these systems have no way to manage the incoming requests and determine if they can be executed or need to wait until the maintenance completes.

Hence, there is a need for more robust control over the scheduling and prioritization of workloads in a multi-tenant system.

BRIEF SUMMARY

A set of embodiments provides novel tools for controlling workloads in a multi-tenant environment. Some such tools provide a queue controller that can control workflow processing across systems, work (provisioning engines, computing clusters, and/or physical data centers. In an aspect, a queue controller can determine the status of each work request based on one or more attributes, such as the workflow type, the systems affected by (and/or involved with) the workflow, information about the tenant requesting the workflow, the job type, and/or the like. In another aspect, a queue controller can be policy-based, such that policies can be configured for one or more of these attributes, and the attribute(s) of an individual request can be analyzed against one or more applicable policies to determine the status of the request. Based on this status, the requested work can be scheduled.

The tools provided by various embodiments include, without limitation, methods, systems, and/or software products. Merely by way of example, a method might comprise one or more procedures, any or all of which are executed by a computer system. Correspondingly, an embodiment might provide a computer system configured with instructions to perform one or more procedures in accordance with methods provided by various other embodiments. Similarly, a computer program might comprise a set of instructions that are executable by a computer system (and/or a processor therein) to perform such operations. In many cases, such software programs are encoded on physical, tangible and/or non-transitory computer readable media (such as, to name but a few examples, optical media, magnetic media, and/or the like).

Merely by way of example, a method of processing incoming work requests in a multi-tenant cloud computing environment, in accordance with one set of embodiments, might comprise providing, with a computer, a policy-based queue controller to implement workflow controls in the cloud computing environment. In some cases, the method might further comprise processing, with the policy-based queue controller, work requests against the cloud computing environment to determine provisioning order of different workflows The method, in some cases, also comprises analyzing, with the policy-based queue controller, an incoming work request. In some cases, this analysis can include identifying one or more attributes of the work request that impact one or more policies defined for the cloud computing environment. The method, then, can include applying, with the policy-based queue controller the one or more policies against the one or more attributes of the work request. The method might further comprise determining, with the queue controller, a status of the work request, based on application of the one or more policies and/or queuing, with the queue controller, the work request for execution by one or more computer systems in the cloud computing environment, based on the determined status of the work request.

Similarly, an apparatus might comprise a non-transitory computer readable medium having encoded thereon a set of instructions executable by one or more computers to perform one or more operations for managing incoming work requests in a cloud computing environment. In some implementations, the set of instructions might comprise instructions to perform one or more operations in accordance with methods provided by various embodiments.

For instance, the set of instructions might comprise instructions to provide a policy-based queue controller to control workflow in the cloud computing environment and/or instructions to process, with the policy-based queue controller, work requests against the cloud computing environment to determine provisioning order of different workflows. The set of instructions might further include instructions to analyze, with the policy-based queue controller, an incoming work request by identifying one or more attributes of the work request that impact one or more policies defined for the cloud computing environment and/or instructions to apply, with the policy-based queue controller, the one or more policies against the one or more attributes of the work request. There might be further instructions to determine, with the queue controller, a status of the work request, based on application of the one or more policies and/or instructions to queue, with the queue controller, the work request for execution by one or more computer systems in the cloud computing environment, based on the determined status of the work request.

A computer system provided by another set of embodiments might comprise one or more processors and a computer readable medium in communication with the one or more processors. The computer readable medium might have encoded thereon a set of instructions executable by the computer system to perform one or more operations for managing incoming work requests in a cloud computing environment, such as operations in accordance with various methods provided by different embodiments, including without limitation some or all of the instructions described above.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION OF CERTAIN EMBODIMENTS

Figure 1A:
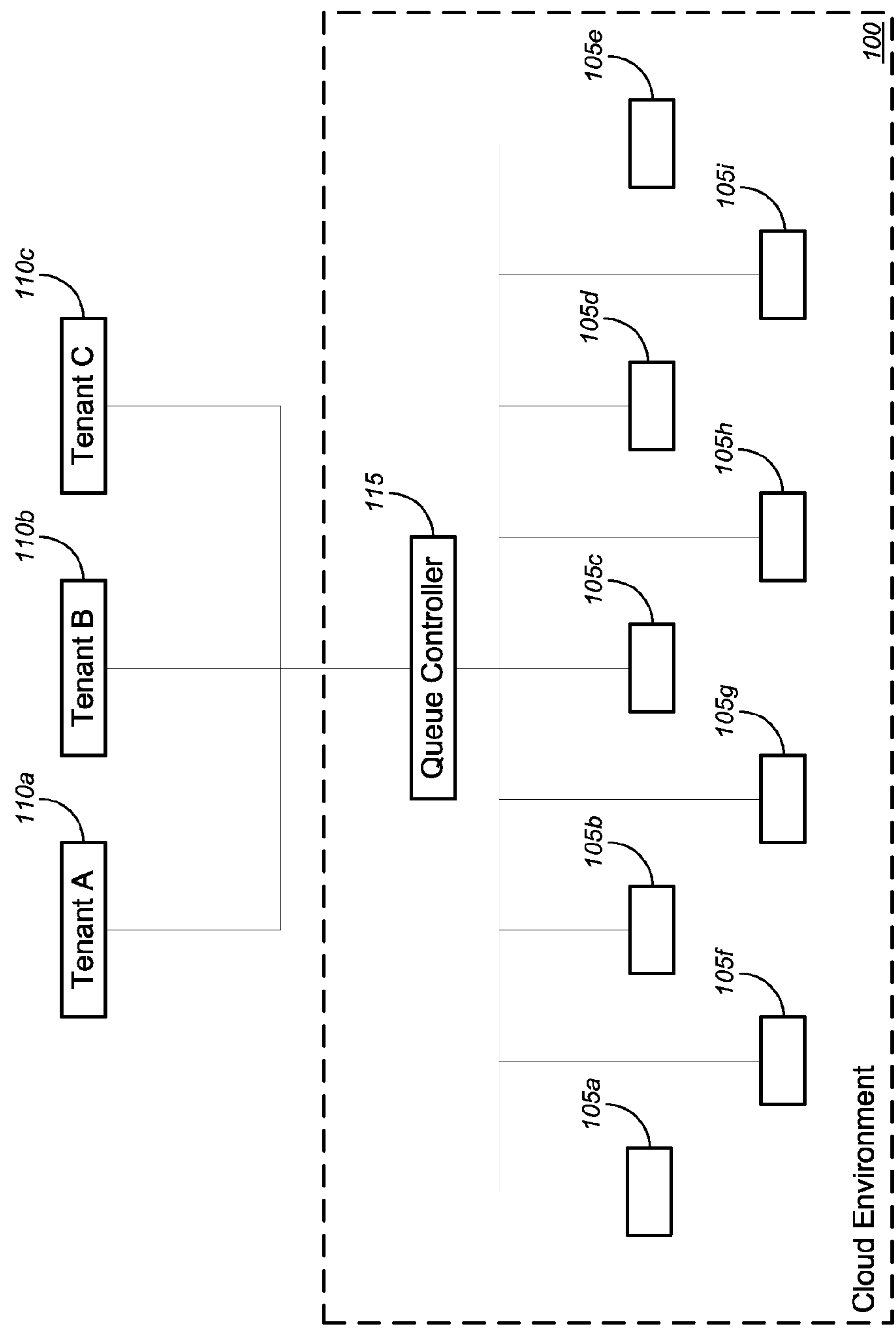
FIGS. 1A-1C are block diagrams illustrating multi-tenant cloud computing systems, in accordance with various embodiments.

While various aspects and features of certain embodiments have been summarized above, the following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

Certain embodiments provide for solutions (including without limitation systems, methods and/or software) for controlling workloads in a multi-tenant cloud computing environment. As used herein, the term "multi-tenant cloud computing environment" means a hosted environment in which a plurality of customers (tenants) are provided computing resources from a cloud computing environment operated by the hosting provider. A cloud computing environment is a computing environment that features a pool of computing resources (which can include, without limitation processors, memory, nonvolatile data storage, network bandwidth, etc.) that can be allocated to various tenants to service workloads requested by those tenants. Examples of workloads are any type of processing tasks, such as processing transactions in an enterprise application or transaction processing application, performing database queries (e.g., structured query language ("SQL") queries in a database management system), rendering scenes in a video production application, even responding to user input in an office application, if that application is hosted in a multi-tenant environment, or storing data in a cloud storage facility.

FIG. 1A illustrates an exemplary cloud environment 100, in which a plurality of nodes 105 can be used to service requests of different tenants 110. Each node 105 might be a separate physical computer system (with a processor, memory, nonvolatile storage, input/output capabilities, etc.) or virtual computer system (with a virtualized processor, memory, storage, etc. implemented, e.g., by hypervisor and/or virtualization software running on one or more physical computer systems). Alternatively and/or additionally, one or more nodes 105 might provide a particular resource (such as processing), while other nodes 105 provide other resources (such as memory, nonvolatile storage, etc.). In an aspect of some embodiments, the computing resources (e.g., nodes 105) of the cloud environment 100 are shared among the various tenants 110. Each tenant 110 can access the resources of the cloud environment 100 by submitting a work request (e.g., from a software program outside the cloud via an application programming interface ("API"), via a web-based request, etc.). This work request requests that the cloud environment 100 allocate resources (e.g., nodes 105) to complete a workload (generally speaking, a computing job) specified by the work request.

Because each of the tenants 110 imposes a demand on the cloud environment 100 only a work request is pending (rather than requiring full-time dedicated availability of resources sufficient to respond to the work request), the aggregate "apparent" computing resources available to each tenant 110 can be far greater than the sum of the resources provided by the nodes 105 themselves, because all of the tenants 110 generally will not impose simultaneous demand on of the resources provided within the cloud environment 110. From time to time, however, two tenants 110 might submit simultaneous work requests, or work requests that overlap, in that a second request is received before the cloud environment 110 has completed processing the workload from the first requests. Similarly, a single tenant 110 might submit two simultaneous and/or overlapping work request. The "workflow" of the cloud environment 100 comprises all of the pending computing jobs (i.e., jobs currently executing or awaiting execution) at a given time.

It should be noted, at this point, that although FIG. 1A illustrates—for descriptive purposes only—a cloud environment 100 featuring nine nodes 105 servicing three tenants 110, the illustrated embodiment should not be considered limiting; a more typical cloud environment in accordance with other embodiments might feature dozens, hundreds, or thousands of nodes and might service hundreds or thousands of tenants. In such an environment, multiple, competing (e.g., simultaneous and/or overlapping) work requests are a nearly constant operating condition. In such situations, the cloud environment 100 needs a facility for allocating resources (e.g., nodes 105) among the competing work requests and managing the workflow of the cloud environment 100, for example, by scheduling jobs (i.e., queuing the jobs in a particular order for processing, assigning jobs to different resources, etc.) so as to ensure the orderly processing of work requests.

Accordingly, the cloud environment 100 features a queue controller 115 that can receive work requests from the tenants 110 and control workflow processing across systems, work (provisioning) engines, computing clusters, and/or physical data centers (any of which can be considered a node 105, as illustrated in FIG. 1A). In an aspect of some embodiments, the queue controller 115 implements policies that can be configured (e.g., by an administrator). These policies can be applied against an implicated attributes of a work request, and based on the application of these policies, the queue controller 115 can determine the status of each work request based on one or more attributes, such as the workflow type, the systems affected by (and/or involved with) the workflow, information about the tenant requesting the workflow, the job type, and/or the like. The queue controller 115 can then schedule the workload requested by the work request for execution by the cloud environment 100 (e.g., by allocating the workload to a particular node 105 and prioritizing the workload for execution relative to other workloads.

In an aspect, the policies employed the queue controller 115 can be stored in a database (or other data store) located to the queue controller 115 and/or in a central location (where, for example, such policies might be accessible by multiple queue controllers 115, which might have workflow management tasks for the same or different cloud environments 100. As a general matter, the queue controller 115 can be implemented as a software program running on a computer system (e.g., computer hardware such as a processor, etc. as described with regard to FIG. 3, below). The implementation of the queue controller 115 in different embodiments can vary, however.

Figure 1B:
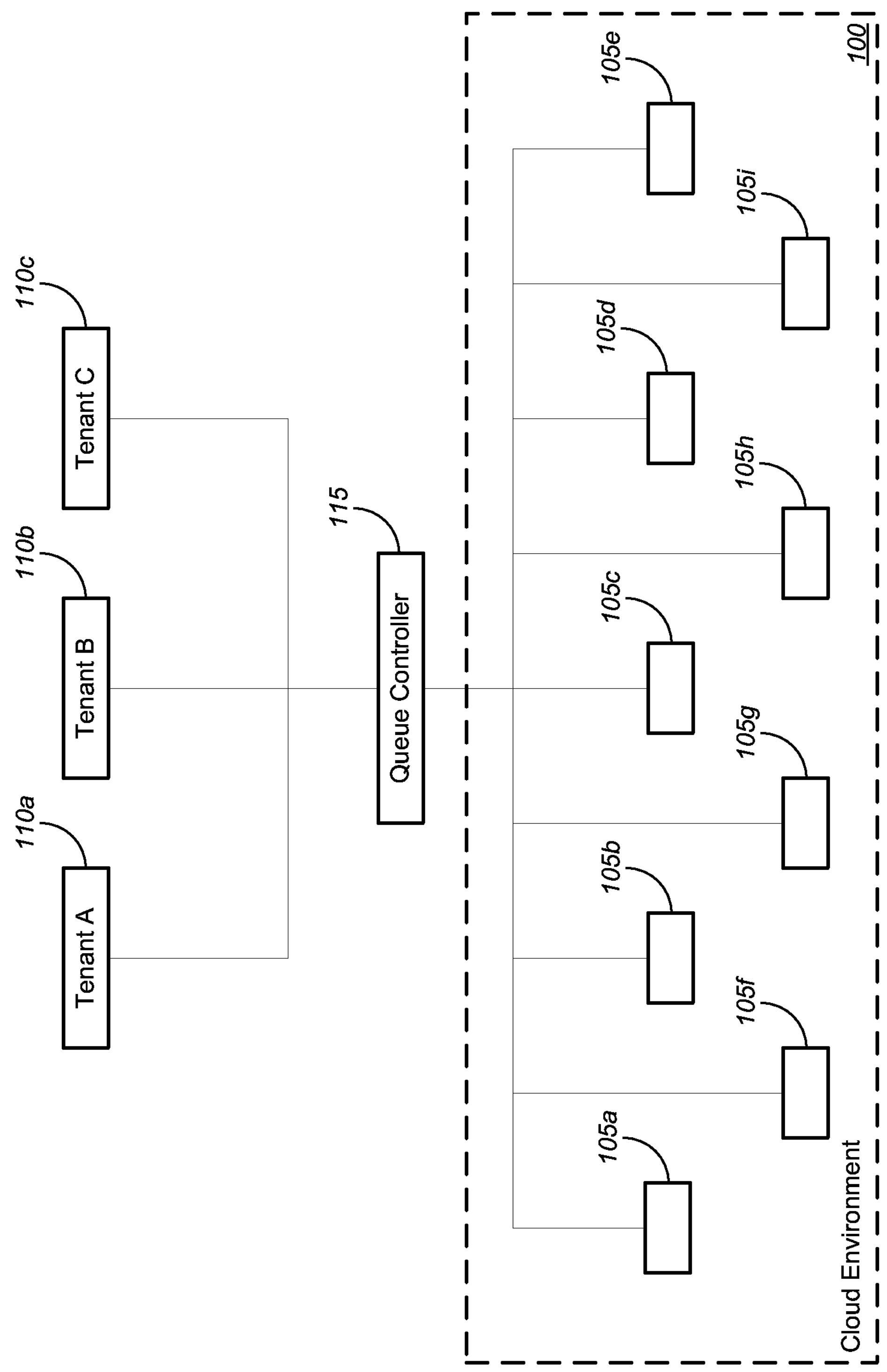
Figure 1C:
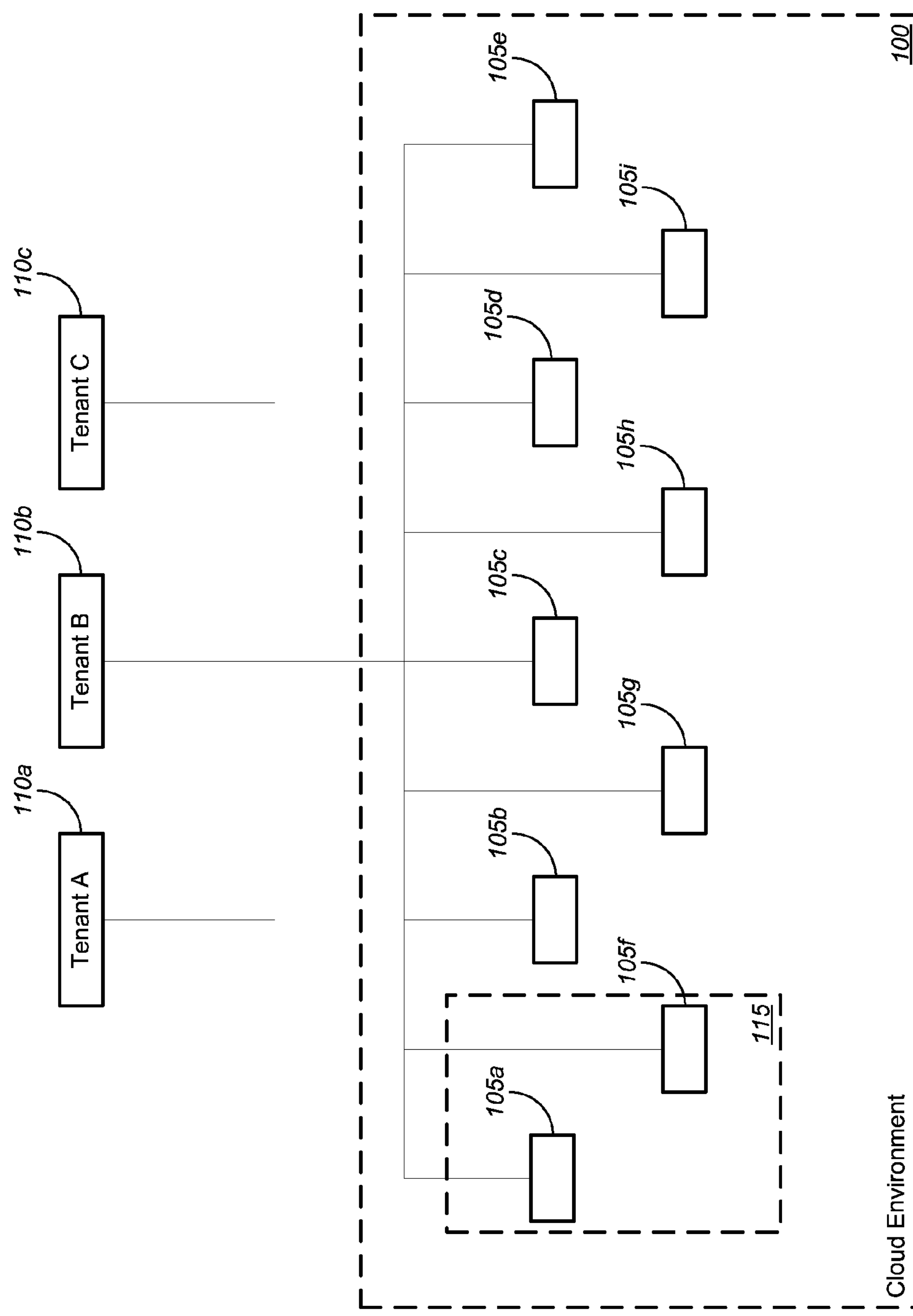

Merely by way of example, in some cases, the queue controller 115 might be implemented as a dedicated computer system (either a node 105 or a separate computer) within the cloud environment 100, as illustrated by FIG. 1A. Alternatively and/or additionally, the queue controller 115 can be implemented as a separate computer system outside the cloud environment 100, as illustrated by FIG. 1B. In a different embodiment, as illustrated by FIG. 1C, the queue controller 115 might be implemented within the cloud 100 itself, using computing resources provided by one or more nodes (e.g., 105*a* and 105*f*), which might also provide computing resources for other tasks within the cloud 100 as well.

Figure 2:
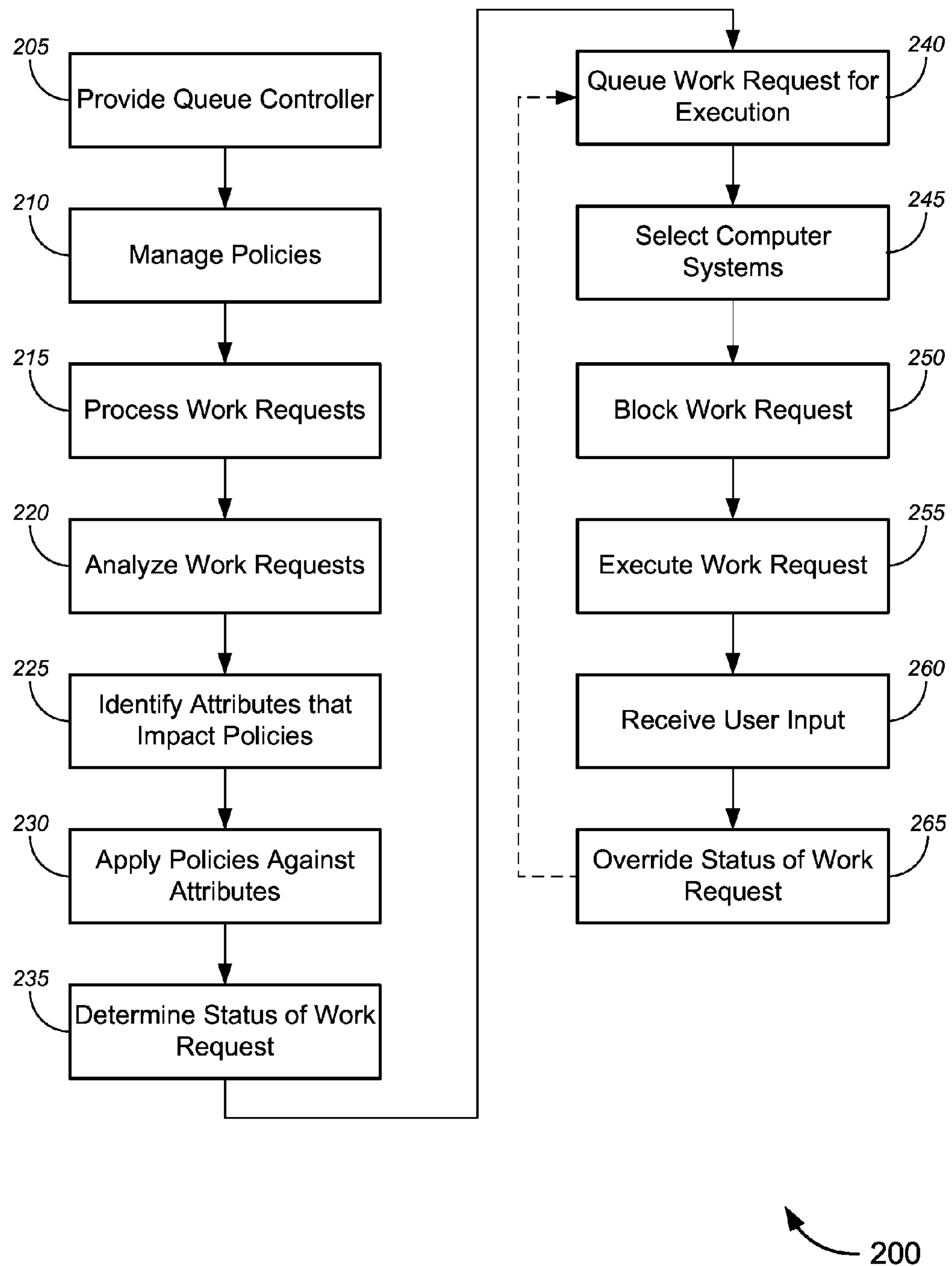
FIG. 2 is a process flow diagram illustrating a method of managing incoming work requests in a multi-tenant system, in accordance with various embodiments.

FIG. 2 illustrates a method 200 of employing a queue controller process incoming work requests in a multi-tenant cloud computing environment (such as the cloud environment 100 described above), in accordance with one set of embodiments. While the techniques and procedures of FIG. 2 are depicted and/or described in a certain order for purposes of illustration, it should be appreciated that certain procedures may be reordered and/or omitted within the scope of various embodiments. Moreover, while the method 200 illustrated by FIG. 2 can be implemented by (and, in some cases, is described below with respect to) the system 100 of FIGS. 1A-1C (or components thereof), these methods may also be implemented using any suitable hardware implementation. Similarly, while the system 100 of FIGS. 1A-1C (and/or components thereof) can operate according to the methods illustrated by FIG. 2 (e.g., by executing instructions embodied on a computer readable medium), the system 100 can also operate according to other modes of operation and/or perform other suitable procedures.

In an aspect, the method 200 comprises providing, with a computer, a policy-based queue controller to implement workflow controls in the cloud computing environment (block 205). In some cases providing the queue controller might comprise executing software on the computer, the software causing the computer to perform the functions of a queue controller as described further herein. As noted above, a wide variety of computer systems can be programmed to operate as a queue controller.

Also as noted above (and described in further detail below), the queue controller analyzes work requests against applicable policies governing the execution of those work requests. Hence, the method 200 might also comprise managing one or more policies that apply to workload control (block 210). Managing a policy can comprise a number of different operations, including without limitations creating a policy, storing the policy in a database or other data store, providing one or more queue controllers with access (e.g., local access, network access, etc.) to the policy in the data store, updating the policy, and/or the like. Embodiments can support a number of different policies.

Merely by way of example, a capacity policy might specify a workload capacity of one or more of the computer systems in the cloud computing environment. Depending on the size of a workload requested by a particular work request, this policy might require the request to be processed by a particular set of nodes that have the capacity (as specified by the policy) to handle the work request. If those node(s) are not available, the work request might have to be delayed until the nodes become available.

Another example of a policy is an entitlement policy defining one or more tenant entitlements in the cloud computing environment. Such a policy might specify what types of work requests a particular tenant can submit, the times that the tenant can submit requests (either requests generally or requests of a particular type), and/or the like. Such a policy might prevent the execution of the work request or delay the execution until a time specified by the policy.

Yet another exemplary policy that might be implemented by some embodiments is a load detection policy that identifies an unusual number of requests from a particular source (e.g., a particular tenant, a particular IP address, etc.). The load detection policy might specify that a certain number of requests (or a certain number of a certain type of request, etc.) received within a given period of time should be handled specially in the queuing process. For instance, some or all of such requests might be delayed for execution, to avoid allowing a single tenant to impose undue load on the cloud environment (e.g., to the detriment of other tenants' work requests). Alternatively and/or additionally, the policy might flag such requests as indicative of an anomaly, such as a misconfiguration at the tenant system, an attempted attack, and/or the like, and execution of such requests might be blocked altogether. Based on these examples, the skilled person should ascertain that the flexible nature of the policy-based queue controller permits the implementation of a great number and variety of policies, depending on the desired implementation.

In some embodiments, the method further comprises processing, with the policy-based queue controller, work requests against the cloud computing environment to determine provisioning order of different workflows (block 215). In other words, as noted above, the queue controller receives the work requests, analyzes those requests against applicable policies, and queues the requests accordingly for execution. This process is described below in further detail with regard to one exemplary work request.

For example, the queue controller might receive a work request (e.g., via an API, web service, etc.) from a tenant. In an aspect, the work request might have a number of attributes, which can be used (as described below) to determine how the work request should be processed. The values of these attributes might be explicit in the request itself, and/or the queue controller might infer the values from other data within the request and/or external to the request.

For instance, one possible attribute of the work request is the workflow type of the request. This attribute corresponds to the type of work that the tenant has requested (with the work request) the cloud environment to perform. Examples include, but are not limited to, provisioning a virtual machine, modifying a virtual machine, adding a firewall, deleting a firewall, etc. Similarly, the job type of the computing job requested by the work request can be an attribute of the request. Examples include, but are not limited to, assigning a virtual machine, modifying configurations, stopping a virtual machine, and/or the like.

Another possible attribute of the request is the identity or identities of any affected systems that will be impacted by the work request. For instance, the work request might explicitly request a particular set of resources (such as a particular computer system, which could be a physical machine, virtual machine, etc., in the cloud environment). In other cases, the work request might implicitly require certain resources (e.g., a virtual computer system that is assigned for the use of the tenant submitting the work request, which might or might not require specific physical resources).

A further example of a possible attribute of a work request is the identity of the customer submitting the request and/or the type of customer submitting the request. This attribute can affect scheduling in a number of ways. For instance, some customers might have a higher priority for job processing (for instance, such customers might subscriber to a higher tier of services than others) and/or might have specific service level agreements, which must be honored, with the provider. The customer's identity and/or customer type can be used to identify such tenants for special processing of work requests. As another example, a particular customer might have service cap for a particular period (e.g., a daily processing cap, a weekly cap, a monthly cap, etc.), and if that customer has already submitted work requests exceeding that cap, an incoming request might be treated differently (e.g., by holding the request until the next period, by placing the customer's request at a lower priority, etc.).

At block 220, the queue controller analyzes the incoming work request. Analyzing the work request can include a number of operations. Merely by way of example, as noted above, a work request typically will have several attributes that characterize a work request, and analyzing the work request can comprise analyzing the attributes. Thus, the queue controller might analyze the customer identification attribute to identify a customer (tenant) that submitted the work request. Similarly, the queue controller might determine that a particular set of resources are necessary to perform the requested workload, that the tenant has requested that the workload be processed at a particular time, on a particular schedule, etc.

In some cases, the analysis of the incoming work request can include identifying one or more attributes of the work request that impact one or more policies defined for the cloud computing environment (block 225). Merely by way of example, in one embodiment, this procedure can include identifying any policies that are configured for the cloud computing environment at the time. If particular aspect of some embodiments, each policy might specify one or more attributes to which the policy applies. For each configured policy, then, the queue controller can collect a list of attributes to which the policy applies, and can create a consolidated list of attributes that impact all of the currently configured policies. The queue controller can then identify all attributes of the incoming work request that match this list. (It should be noted that any suitable procedure can be used to identify relevant attributes and that the described procedure is provided merely for illustrative purposes.)

Accordingly, in some embodiments, the method 200 might comprise applying, e.g., with the policy-based queue controller, the one or more policies against the one or more attributes of the work request that have been identified as impacting the policies (block 230). The method 200 thus further comprises determining (and/or assigning), with the queue controller, a status of the work request (block 235). In some cases, the status can be determined, at least in part, from application of the applicable policy or policies. In an aspect, the policies can be applied to the attributes based on a workflow order and/or the cloud computing environment status. In other words, in some cases, the impact of the policy, when applied to the attributes, on determining the status of the work request, can depend on the status of the cloud environment itself. So, for example, if the cloud environment has multiple computer systems down for maintenance, application of a policy might have a different outcome than if all systems were operational. Similarly, the application of a policy might result in different statuses during heavy workflow and light workflow periods, respectively.

To illustrate the determination of a work request's status, consider the following examples: In one case, the incoming request might request a particularly processing-intensive computing job, in the nature of this job might be identified as an attribute of the incoming work request. The cloud computing environment might have a policy configured to require such jobs to be performed at off-peak times. By applying this policy to the work request, the work request might be assigned the status of "to be scheduled at 2:00 AM." As another example, if a work request has an attribute that identifies a particular tenant as being responsible for the work request, and application of a policy indicates that requests from that particular tenant are suspicious (e.g., because a large number of requests from the same tenant are received within a particular timeframe, etc.) status of the request may be determined to be "held pending administrator review." As a further example, a policy might specify that all work requests from a particular tenant are to be performed by particular computer system (which might be a virtual computer, physical computer, computing cluster, etc.) that is allocated to that particular tenant; when a work request is received from that tenant, the application of the policy might result in the assignment of a status that indicates that the requested job should be performed by the assigned computer system as soon as possible.

At block 240, the method 200 comprises queuing, with the queue controller, the work request for execution by one or more computer systems in the cloud computing environment. In an aspect, the work request is queued based on the determined status of the work request. For example, if the status of the work quest indicates that the requested computing job should be performed on a particular system and/or a particular time, queuing the request for execution can take those factors into account. Similarly if the status of the request indicates a particular ordering or priority, during the request and take that ordering and/or priority into account as well.

Queuing the work request can comprise a variety of different operations. In a general sense, queuing the request comprises scheduling the computing job contemplated by the request to be performed as determined by the status of the request. If the status of the request does not require a particular computer system and/or set of resources to process the computing job, the job might be placed in a general queue to be processed by the next available computer system. Likewise, if the status of the request does not indicate any particular priority of the request, the request might be placed at the end of a queue containing all pending jobs, such that the request be executed upon completion of the pending jobs. In other cases, however, the status of the request might indicate a higher than normal priority, and queuing the work request for execution might, for example, include inserting the request in the queue ahead of other pending jobs with lower priorities. By the same token, if the status of the request indicates that the request is of a lower than normal priority, the job might be placed in the queue, subject to preemption by later arriving, but higher priority, requests.

Similarly, in some embodiments, queuing the work request might comprise selecting one or more computer systems (e.g., nodes), from among a plurality of computer systems in the cloud computing environment, to perform the computing job (block 245). Such a computer system might be a physical computer system, a virtual machine, a computer cluster, a particular physical data center, and/or the like. Merely by way of example, in some cases, the cloud environment might comprise a plurality of computer systems (which might include virtual machines and/or separate physical computer systems), and queuing the work request might comprise selecting one or more particular computer systems to perform the requested computing job. In some cases, the cloud environment might include computer systems (either physical or virtual) that are dedicated to the customer (tenant) requesting the job, and selecting one or more computer systems thus might comprise selecting one or more customer computer systems (e.g., based on the customer identity attribute of the request).

Alternatively and/or additionally, in some cases, one or more of the computer systems (e.g., nodes) in the cloud environment might be unavailable. For example, one or more systems might be offline for system maintenance, or a computer system might be unavailable because a prior computing job has not completed (in which case the system might be unavailable until the job completes) or has failed (in which case the system might be unavailable until the job has been cleared and/or the system has been restarted. The queue controller, in an aspect, is configured to identify systems that are unavailable for these (and other) reasons, and to queue work requests only to systems that are available to perform the requested computing jobs.

In other cases, queuing the work request might comprise blocking the work request from executing (block 250). Merely by way of example, the queue controller might not allow the work request to execute for a particular period of time, for a variety of reasons, including without limitation those described above. In some cases, the work request might be blocked for a particular period of time and/or until the request can be reviewed (e.g., by an administrator). In other cases, the work request might be blocked permanently. Merely by way of example, a resource-intensive job might be blocked during peak times and then allowed to process during an off-peak time. As another example, a work request that has the status indicating that the request is suspected to be a mistake and/or malicious might be blocked pending further review and/or might be blocked permanently, depending on the nature of the request in that application of relevant policies to the request. If a request is blocked, a notification might be sent to the tenant that submitted the request; this notification might indicate status of the request and/or any action that the tenant can take to request review of that status.

(While notifications are not discussed in detail herein, one skilled in the art should appreciate that a variety of notifications can be sent in conjunction with the operation of the queue controller; merely by way of example, the queue controller might send a notification to a tenant confirming the request has been received, might send another notification indicating that a status has been determined for the request and/or estimated completion time for the request, based on the determined status, might certainly notification when requested computing job has been completed, etc. Such notifications might be sent by electronic mail, text message, webpage, and/or any other suitable mode of communication.)

If not blocked, the queued work request can then be executed by the cloud environment as scheduled (block 255). Execution of the work request can comprise performing the computing job requested by the work request, on the schedule and with the resources specified by the status of the request.

In some cases, the system might provide the ability for a user (such as an administrator of the cloud environment, or, in some cases, the tenant itself) to override the automated queuing imposed by the queue controller. Accordingly, the method 200 might comprise receiving user input (e.g., from the administrator) (block 260) and overriding the status of the work request, based on the user input (block 265). This user input might be received directly at an administrator console of the queue controller. Alternatively and/or additionally, the queue controller might provide an API interface, a web interface, and/or the like, and such user input can be received through such interfaces. In an aspect, user input might assign a different status to the work request than the status assigned by the queue controller originally. Merely by way of example, if the queue controller set the status of the request to "blocked," for whatever reason, the administrator input might remove that status to allow the request to be processed. In other cases, the user input might assign a different priority to the request, such that it is scheduled for processing sooner or later than originally assigned, and/or the user input might assign the work request on a particular computer system, etc. At that point, the work request can be queued (block 240) according to the status assigned by the administrator (or other user), as shown by the broken line on FIG. 2, and the method 200 can proceed as indicated above.

Figure 3:
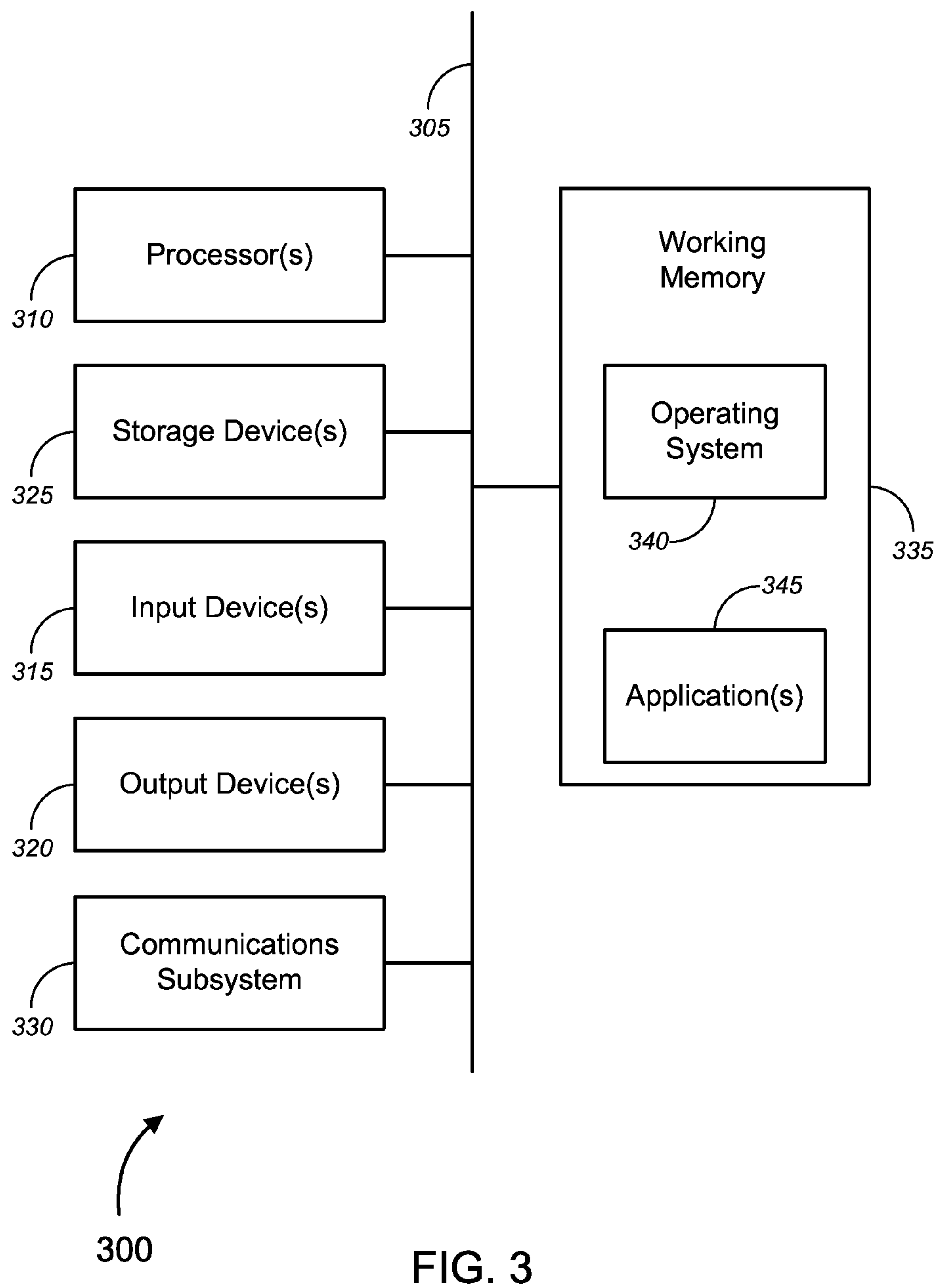
FIG. 3 is a generalized schematic diagram illustrating a computer system, in accordance with various embodiments.

FIG. 3 provides a schematic illustration of one embodiment of a computer system 300 that can perform the methods provided by various other embodiments, as described herein, and/or can function as queue controller, cloud computing node, and/or the like. It should be noted that FIG. 3 is meant only to provide a generalized illustration of various components, of which one or more (or none) of each may be utilized as appropriate. FIG. 3, therefore, broadly illustrates how individual system elements may be implemented in a relatively separated or relatively more integrated manner.

The computer system 300 is shown comprising hardware elements that can be electrically coupled via a bus 305 (or may otherwise be in communication, as appropriate). The hardware elements may include one or more processors 310, including without limitation one or more general-purpose processors and/or one or more special-purpose processors (such as digital signal processing chips, graphics acceleration processors, and/or the like); one or more input devices 315, which can include without limitation a mouse, a keyboard and/or the like; and one or more output devices 320, which can include without limitation a display device, a printer and/or the like.

The computer system 300 may further include (and/or be in communication with) one or more storage devices 325, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable and/or the like. Such storage devices may be configured to implement any appropriate data stores, including without limitation, various file systems, database structures, and/or the like.

The computer system 300 might also include a communications subsystem 330, which can include without limitation a modem, a network card (wireless or wired), an infra-red communication device, a wireless communication device and/or chipset (such as a Bluetooth™ device, an 802.11 device, a WiFi device, a WiMax device, a WWAN device, cellular communication facilities, etc.), and/or the like. The communications subsystem 330 may permit data to be exchanged with a network (such as the network described below, to name one example), with other computer systems, and/or with any other devices described herein. In many embodiments, the computer system 300 will further comprise a working memory 335, which can include a RAM or ROM device, as described above.

The computer system 300 also may comprise software elements, shown as being currently located within the working memory 335, including an operating system 340, device drivers, executable libraries, and/or other code, such as one or more application programs 345, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be encoded and/or stored on a non-transitory computer readable storage medium, such as the storage device(s) 325 described above. In some cases, the storage medium might be incorporated within a computer system, such as the system 300. In other embodiments, the storage medium might be separate from a computer system (i.e., a removable medium, such as a compact disc, etc.), and/or provided in an installation package, such that the storage medium can be used to program, configure and/or adapt a general purpose computer with the instructions/code stored thereon. These instructions might take the form of executable code, which is executable by the computer system 300 and/or might take the form of source and/or installable code, which, upon compilation and/or installation on the computer system 300 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware (such as programmable logic controllers, field-programmable gate arrays, application-specific integrated circuits, and/or the like) might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 300) to perform methods in accordance with various embodiments of the invention. According to a set of embodiments, some or all of the procedures of such methods are performed by the computer system 300 in response to processor 310 executing one or more sequences of one or more instructions (which might be incorporated into the operating system 340 and/or other code, such as an application program 345) contained in the working memory 335. Such instructions may be read into the working memory 335 from another computer readable medium, such as one or more of the storage device(s) 325. Merely by way of example, execution of the sequences of instructions contained in the working memory 335 might cause the processor(s) 310 to perform one or more procedures of the methods described herein.

The terms "machine readable medium" and "computer readable medium," as used herein, refer to any medium that participates in providing data that causes a machine to operation in a specific fashion. In an embodiment implemented using the computer system 300, various computer readable media might be involved in providing instructions/code to processor(s) 310 for execution and/or might be used to store and/or carry such instructions/code (e.g., as signals). In many implementations, a computer readable medium is a non-transitory, physical and/or tangible storage medium. Such a medium may take many forms, including but not limited to, non-volatile media, volatile media, and transmission media. Non-volatile media includes, for example, optical and/or magnetic disks, such as the storage device(s) 325. Volatile media includes, without limitation, dynamic memory, such as the working memory 335. Transmission media includes, without limitation, coaxial cables, copper wire and fiber optics, including the wires that comprise the bus 305, as well as the various components of the communication subsystem 330 (and/or the media by which the communications subsystem 330 provides communication with other devices). Hence, transmission media can also take the form of waves (including without limitation radio, acoustic and/or light waves, such as those generated during radio-wave and infrared data communications).

Common forms of physical and/or tangible computer readable media include, for example, a floppy disk, a flexible disk, a hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 310 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 300. These signals, which might be in the form of electromagnetic signals, acoustic signals, optical signals and/or the like, are all examples of carrier waves on which instructions can be encoded, in accordance with various embodiments of the invention.

The communications subsystem 330 (and/or components thereof) generally will receive the signals, and the bus 305 then might carry the signals (and/or the data, instructions, etc. carried by the signals) to the working memory 335, from which the processor(s) 305 retrieves and executes the instructions. The instructions received by the working memory 335 may optionally be stored on a storage device 325 either before or after execution by the processor(s) 310.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture but instead can be implemented on any suitable hardware, firmware and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. By the same token, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A method of processing incoming work requests in a multi-tenant cloud computing environment, the method comprising:

providing, with a computer, a policy-based queue controller to implement workflow controls to control workflow in the cloud computing environment, the workflow comprising all pending work requests received by the cloud computing environment at a particular time;

processing, with the policy-based queue controller, work requests against the cloud computing environment to determine provisioning order of different workflows;

analyzing, with the policy-based queue controller, an incoming work request by identifying one or more attributes of the work request that impact one or more policies defined for the cloud computing environment, the one or more policies governing execution of the work requests;

determining, with the policy-based queue controller, a status of the work request, based on the analysis of the incoming work request as it impacts the one or more policies, wherein determining the status of the work request comprises, based on a determination that the incoming work request is likely one of a mistake or an attempted attack, determining, with the policy-based queue controller, a status of the work request comprising an indication that the work request is to be one of blocked permanently or blocked pending administrative review; and queuing, with the policy-based queue controller, the incoming work request for execution by one or more computer systems in the cloud computing environment, based on the determined status of the work request, wherein queuing the incoming work request for execution comprises, based on a determination that the determined status of the work request comprises an indication that the work request is to be one of blocked permanently or blocked pending administrative review, preventing, with the policy-based queue controller, execution of the incoming work request, wherein the one or more policies are applied to the incoming work request, based on a workflow order and a cloud computing environment status.

2. The method of claim 1, wherein the one or more attributes of the incoming request comprise a workflow type.

3. The method of claim 1, wherein the one or more attributes of the incoming request comprise an affected system that will be impacted by the work request.

4. The method of claim 1, wherein the one or more attributes of the incoming request comprise a customer type of a customer submitting the work request.

5. The method of claim 1, wherein the one or more attributes of the incoming request comprise an identification of a customer submitting the work request.

6. The method of claim 1, wherein the one or more attributes of the incoming request comprise a job type of a requested computing job.

7. The method of claim 1, wherein the one or more policies comprise a capacity policy specifying a workload capacity of one or more of the computer systems in the cloud computing environment.

8. The method of claim 1, wherein the one or more policies comprise an entitlement policy defining one or more tenant entitlements in the cloud computing environment.

9. The method of claim 1, wherein the one or more policies comprise a load detection policy that identifies an unusual number of requests from a particular source.

10. The method of claim 1, further comprising:

receiving user input from an administrator; and overriding the status of the work request, based on the user input.

11. The method of claim 1, wherein queuing the work request comprises selecting one or more computer systems, from among a plurality of computer systems in the cloud computing environment, to perform the computing job.

12. The method of claim 11, wherein one or more of the plurality of computer systems are unavailable to perform the computing job, and wherein selecting one or more computer systems comprises selecting one or more customer computer systems.

13. The method of claim 11, wherein one or more of the plurality of computer systems are unavailable to perform the computing job, and wherein selecting one or more computer systems comprises selecting a computer system that is available.

14. The method of claim 13, wherein the unavailable one or more computer systems are undergoing system maintenance.

15. The method of claim 13, wherein the unavailable one or more computer systems are unavailable because a customer job failed.

16. The method of claim 11, wherein the selected computer system is a computing cluster.

17. The method of claim 1, wherein queuing the work request comprises delaying the work request from executing for a period of time.

18. An apparatus, comprising:

a non-transitory computer readable medium having encoded thereon a set of instructions executable by one or more computers to perform one or more operations for managing incoming work requests in a cloud computing environment, the set of instructions comprising:

instructions to provide a policy-based queue controller to control workflow in the cloud computing environment, the workflow comprising all pending work requests received by the cloud computing environment at a particular time;

instructions to process, with the policy-based queue controller, work requests against the cloud computing environment to determine provisioning order of different workflows;

instructions to analyze, with the policy-based queue controller, an incoming work request by identifying one or more attributes of the work request that impact one or more policies defined for the cloud computing environment, the one or more policies governing execution of the work requests;

instructions to determine, with the policy-based queue controller, a status of the work request, based on the analysis of the incoming work request as it impacts the one or more policies, wherein the instructions to determine the status of the work request comprises instructions to, based on a determination that the incoming work request is likely one of a mistake or an attempted attack, determine a status of the work request comprising an indication that the work request is to be one of blocked permanently or blocked pending administrative review; and instructions to queue, with the policy-based queue controller, the incoming work request for execution by one or more computer systems in the cloud computing environment, based on the determined status of the work request, wherein instructions to queue the incoming work request for execution comprises instructions to, based on a determination that the determined status of the work request comprises an indication that the work request is to be one of blocked permanently or blocked pending administrative review, prevent execution of the incoming work request, wherein the one or more policies are applied to the incoming work request, based on a workflow order and a cloud computing environment status.

19. A computer system, comprising:

one or more processors; and a computer readable medium in communication with the one or more processors, the computer readable medium having encoded thereon a set of instructions executable by the one or more processors to cause the computer system to perform one or more operations for managing incoming work requests in a cloud computing environment, the set of instructions comprising:

instructions to provide a policy-based queue controller to control workflow in the cloud computing environment, the workflow comprising all pending work requests received by the cloud computing environment at a particular time;

instructions to process, with the policy-based queue controller, work requests against the cloud computing environment to determine provisioning order of different workflows;

instructions to analyze, with the policy-based queue controller, an incoming work request by identifying one or more attributes of the work request that impact one or more policies defined for the cloud computing environment, the one or more policies governing execution of the work requests;

instructions to determine, with the policy-based queue controller, a status of the work request, based on the analysis of the incoming work request as it impacts the one or more policies, wherein the instructions to determine the status of the work request comprises instructions to, based on a determination that the incoming work request is likely one of a mistake or an attempted attack, determine a status of the work request comprising an indication that the work request is to be one of blocked permanently or blocked pending administrative review; and instructions to queue, with the policy-based queue controller, the incoming work request for execution by one or more computer systems in the cloud computing environment, based on the determined status of the work request, wherein instructions to queue the incoming work request for execution comprises instructions to, based on a determination that the determined status of the work request comprises an indication that the work request is to be one of blocked permanently or blocked pending administrative review, prevent execution of the incoming work request, wherein the one or more policies are applied to the incoming work request, based on a workflow order and a cloud computing environment status.

* * * * *